United States Patent
Nishino et al.

(10) Patent No.: US 10,534,376 B2
(45) Date of Patent: Jan. 14, 2020

(54) GAS DIVIDED FLOW SUPPLYING APPARATUS FOR SEMICONDUCTOR MANUFACTURING EQUIPMENT

(71) Applicant: FUJIKIN INCORPORATED, Osaka (JP)

(72) Inventors: Kouji Nishino, Osaka (JP); Ryousuke Dohi, Osaka (JP); Kaoru Hirata, Osaka (JP); Katsuyuki Sugita, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 651 days.

(21) Appl. No.: 14/397,137

(22) PCT Filed: Apr. 1, 2013

(86) PCT No.: PCT/JP2013/002257
§ 371 (c)(1),
(2) Date: Mar. 4, 2015

(87) PCT Pub. No.: WO2013/161187
PCT Pub. Date: Oct. 31, 2013

(65) Prior Publication Data
US 2015/0192932 A1 Jul. 9, 2015

(30) Foreign Application Priority Data
Apr. 27, 2012 (JP) .................. 2012-103857

(51) Int. Cl.
G05D 7/06 (2006.01)
(52) U.S. Cl.
CPC .... G05D 7/0641 (2013.01); *Y10T 137/87772* (2015.04)
(58) Field of Classification Search
CPC ... G05D 7/0664; G05D 7/0658; G05D 7/0641
(Continued)

(56) References Cited

U.S. PATENT DOCUMENTS 4,250,553 A * 2/1981 Sebens ............... F23N 1/00
356/315
6,289,923 B1 * 9/2001 Ohmi ............... G05D 7/0635
137/486
(Continued)

FOREIGN PATENT DOCUMENTS

JP 09-330128 A 12/1997
JP 2000-305630 A 11/2000
(Continued)

OTHER PUBLICATIONS

International Search Report issued in corresponding application PCT/JP2013/002257, completed Apr. 17, 2013 and dated May 7, 2013.

*Primary Examiner* — Craig M Schneider
*Assistant Examiner* — Angelisa L. Hicks
(74) *Attorney, Agent, or Firm* — Merchant & Gould, P.C.

(57) ABSTRACT

A gas divided flow supplying apparatus, including a control valve 3, a pressure type flow control unit 1a connected to a process gas inlet 11, a gas supply main pipe 8 connected to the downstream side of control valve 3, a plurality of branched pipe passages 9a, 9n connected in parallel to the downstream side of main pipe 8, opening and closing valves 10a, 10n interposed in the respective branched pipe passages 9a, 9n, orifices 6a, 6n provided on the downstream sides of valves 10a, 10n, a temperature sensor 4 provided near the process gas passage between the control valve 3 and the orifices 6a, 6n, a pressure sensor 5 provided in the process gas passage between the control valve 3 and the orifices 6a, 6n, divided gas flow outlets 11a, 11n provided on the outlet sides of the orifices 6a, 6n, and an arithmetic and control unit 7.

9 Claims, 5 Drawing Sheets

(58) Field of Classification Search
USPC ... 137/87.03, 87.05, 118.04, 118.06, 119.01, 137/119.06, 486, 487.5, 488
See application file for complete search history.

(56) References Cited

U.S. PATENT DOCUMENTS

| | | | | |
|---|---|---|---|---|
| 8,944,095 | B2* | 2/2015 | Okabe | C23C 16/00 |
| | | | | 137/486 |
| 2001/0013363 | A1* | 8/2001 | Kitayama | C23C 16/44 |
| | | | | 137/7 |
| 2006/0236781 | A1* | 10/2006 | Ohmi | G01F 1/42 |
| | | | | 73/861.52 |
| 2006/0278276 | A1* | 12/2006 | Tanaka | G01F 1/6847 |
| | | | | 137/487.5 |
| 2010/0139775 | A1 | 6/2010 | Ohmi et al. | |
| 2010/0145633 | A1* | 6/2010 | Yasuda | G05D 7/0635 |
| | | | | 702/45 |
| 2010/0163119 | A1* | 7/2010 | Isobe | G01F 1/6842 |
| | | | | 137/486 |

FOREIGN PATENT DOCUMENTS

| | | | |
|---|---|---|---|
| JP | 2003-323217 A | 11/2003 |
| JP | 2007-004644 A | 1/2007 |
| JP | 2008-009554 A | 1/2008 |
| JP | 2009-252147 A | 10/2009 |

* cited by examiner

PRIOR ART

PRIOR ART

GAS DIVIDED FLOW SUPPLYING APPARATUS FOR SEMICONDUCTOR MANUFACTURING EQUIPMENT

This is a National Phase application in the United States of International Patent Application No. PCT/JP2013/002257 filed Apr. 1, 2013, which claims priority on Japanese Patent Application No. 2012-103857, filed Apr. 27, 2012. The entire disclosures of the above patent applications are hereby incorporated by reference.

TECHNICAL FIELD

The present invention relates to an improvement in a gas supplying apparatus for semiconductor manufacturing equipment, and specifically, to a gas divided flow supplying apparatus for semiconductor manufacturing equipment that can accurately divide and supply necessary amounts of a process gas to a plurality of process chambers to perform the same process by using a plurality of orifices joined in parallel as orifices of a pressure type flow control system, and enables to arbitrarily check actual flow rates of the process gas being divided and supplied by organically combining the pressure type flow control system with a thermal type mass flow control system.

BACKGROUND OF THE INVENTION

In the gas supplying apparatus for semiconductor manufacturing equipment, conventionally, a thermal type flow control system and a pressure type flow control system are widely used.

FIG. 5 shows a pressure type flow control system used in a gas supplying apparatus for semiconductor manufacturing equipment, and this pressure type flow control system FCS includes a control valve CV, a temperature detector T, a pressure detector P, an orifice OL, and an arithmetic and control unit CD, etc., and the arithmetic and control unit CD includes a temperature correction/flow rate arithmetic circuit CDa, a comparison circuit CDb, an input-output circuit CDc, and an output circuit CDd, etc.

In this pressure type flow control system, detection values from the pressure detector P and the temperature detector T are converted into digital signals and input into the temperature correction/flow rate arithmetic circuit CDa. Thereafter, temperature correction of the detected pressure and flow rate computation are performed, and, then, a computed flow rate value Qt is input into the comparison circuit CDb.

On the other hand, a set flow rate signal Qs is input from the terminal In, converted into a digital value in the input-output circuit CDc, and then input into the comparison circuit CDb. Qs is then compared with the computed flow rate value Qt from the temperature correction/flow rate arithmetic circuit CDa. When the computed flow rate value Qt is larger than the flow rate setting signal Qs, a control signal Pd is output to the drive unit of the control valve CV, and the control valve CV is driven in a closing direction via a drive mechanism CVa. That is, the control valve is driven in the valve closing direction until the difference (Qt−Qs) between the computed flow rate value Qt and the flow rate setting signal Qs becomes zero.

The pressure type flow control system FCS itself is known, and has excellent characteristics in which, between the downstream side pressure $P_2$ of the orifice OL (that is, the pressure $P_2$ on the process chamber side) and the upstream side pressure $P_1$ of the orifice OL (that is, the pressure $P_1$ on the outlet side of the control valve CV), when the relationship of $P_1/P_2 \geq$ approximately 2 (so-called critical expansion condition) is held, the flow rate Q of the gas Go distributed through the orifice OL satisfies $Q=KP_1$ (here, K is a constant). By controlling the pressure $P_1$, the flow rate Q can be controlled with high accuracy, and even if the pressure of the gas Go on the upstream side of the control valve CV greatly changes, the control flow rate value hardly changes.

Thus, in the gas supply equipment for semiconductor manufacturing equipment of a type that divides and supplies a gas to one or a plurality of process chambers, as shown in FIG. 6 and FIG. 7, for respective supply lines $GL_1$, $GL_2$, pressure type flow control systems $FCS_1$, $FCS_2$ are provided, respectively, and, accordingly, the gas flow rates $Q_1$, $Q_2$ of the respective supply lines $GL_1$, $GL_2$ are regulated.

Therefore, the pressure type flow control system has to be installed for each divided flow passage of process gas. This creates the basic problem that downsizing and reductions in the cost of the gas supplying apparatus for semiconductor manufacturing equipment are difficult.

In FIG. 6, the reference symbol S denotes a gas supply source, G denotes a process gas, C denotes a chamber, D denotes a two-divided gas discharging device, H denotes a wafer, I denotes a wafer holding base (Japanese Published Unexamined Patent Application No. 2008-009554), and in FIG. 7, the reference symbol RG denotes a pressure regulator, $MFM_1$, $MFM_2$ denote thermal type flow meters, $P_2A$, $P_2B$, $P_1$ denote pressure gauges, $V_1$, $V_2$, $V_3$, $V_4$, $VV_1$, $VV_2$ denote valves, and $VP_1$, $VP_2$ denote exhaust pumps (Japanese Published Unexamined Patent Application No. 2000-305630).

To solve the problem described above in the gas supplying apparatus shown in FIG. 6 and FIG. 7, as shown in FIG. 8, a divided flow supplying apparatus is developed in which sonic nozzles or orifices $SN_1$, $SN_2$ are interposed in the respective branched gas supply lines $GL_1$, $GL_2$. By holding the primary side pressure $P_1$ of each of the orifices $SN_1$, $SN_2$ to be approximately three times as high as the secondary side pressure $P_2$ of the orifices $SN_1$, $SN_2$ by regulating the automatic pressure controller ACP provided on the gas supply source side by a control unit ACQ, predetermined divided flow rates $Q_1$, $Q_2$ determined according to the hole diameters of the orifices $SN_1$, $SN_2$ are obtained (Japanese Published Unexamined Patent Application No. 2003-323217).

However, in the flow control system (divided flow supplying apparatus) disclosed in Japanese Published Unexamined Patent Application No. 2003-323217 described above, the automatic pressure controller ACP, the control unit ACQ, and the orifices $SN_1$, $SN_2$ are installed individually, and the primary side pressure $P_1$ is held at a value three times as high as the secondary side pressure $P_2$ to make the flow rates $Q_1$, $Q_2$ proportional to the primary side pressure $P_1$, and the gas flows that are distributed through the orifices $SN_1$, $SN_2$ are made as flows in the critical states.

As a result, it is necessary to appropriately assemble and integrate the automatic pressure controller ACP, the control unit ACQ, and the orifices $SN_1$, $SN_2$, etc., so that manufacturing of the gas supplying apparatus becomes troublesome. In addition, it is difficult to downsize and compactify the gas supplying apparatus.

Furthermore, the control system of the control unit ACQ and the automatic pressure controller ACP does not adopt so-called feedback control. As a result, it becomes difficult for the automatic pressure controller ACP to swiftly adjust the fluctuation of the primary side pressure $P_1$ caused by opening and closing operations of the opening and closing valves $V_1$, $V_2$. Eventually, the opening and closing operations of the opening and closing valves $V_1$, $V_2$ cause fluctuations of the flow rates $Q_1$, $Q_2$ (or the flow rate Q).

Furthermore, the primary side pressure $P_1$ is regulated by the automatic pressure controller ACP. When the ratio $P_1/P_2$ of the primary side pressure $P_1$ to the secondary side pressure $P_2$ of the orifice is held at approximately 3 or more, the divided flow rates $Q_1$, $Q_2$ are controlled, so that when the value of $P_1/P_2$ approaches approximately 2 and the gas flow becomes a gas flow under a so-called non-critical expansion condition, accurate divided flow control becomes difficult.

PRIOR ART DOCUMENTS

Patent Document

Patent Document 1: Japanese Published Unexamined Patent Application No. 2008-009554
Patent Document 2: Japanese Published Unexamined Patent Application No. 2000-305630
Patent Document 3: Japanese Published Unexamined Patent Application No. 2003-323217

SUMMARY OF THE INVENTION

The present invention as illustrated by the non-limiting preferred embodiments, solves the above-described problems in a gas divided flow supplying apparatus using a conventional pressure type flow control system. Specifically, the problems with the background systems are, (a) downsizing and reductions in the cost of the gas supplying apparatus are difficult when the pressure type flow control system is provided for each gas supply line (each divided flow line), (b) when the primary side pressure $P_1$ of each orifice is regulated by an automatic pressure controller provided on the gas supply source side, and the respective divided gas flow rates $Q_1$, $Q_2$ in proportion to the pressure $P_1$ are supplied through the respective orifices, assembling and manufacturing of the gas supplying apparatus are troublesome and downsizing and compactification of the apparatus are difficult, when any of the divided flow passages is opened or closed, the orifice primary side pressure $P_1$ fluctuates and the divided flow rate of the other divided flow passage (or passages) easily fluctuates, and it becomes difficult to control the divided flow rates $Q_1$, $Q_2$ with high accuracy when the ratio $P_1/P_2$ of the orifice primary side pressure $P_1$ to the secondary side pressure $P_2$ becomes a value (for example, approximately 2 or less in the case of $O_2$ or $N_2$) out of the critical expansion condition, etc. In accordance with one embodiment of the present invention, there is provided a gas divided flow supplying apparatus for semiconductor manufacturing equipment which is structurally simplified and downsized by organically integrating a pressure type flow control system and a thermal type flow control system, and can divide and supply a process gas to a number of process chambers performing the same process economically while performing highly accurate flow control, and can perform highly accurate divided gas flow supply even in a state out of the critical expansion condition, and arbitrarily perform actual flow rate monitoring of the process gas being supplied as necessary.

In accordance with a first embodiment of the present invention, a gas divided flow supplying apparatus for semiconductor manufacturing equipment includes: a control valve 3 constituting a pressure type flow control unit 1a connected to a process gas inlet 11, a gas supply main pipe 8 communicatively connected to the downstream side of the control valve 3, a plurality of branched pipe passages 9a, 9n connected in parallel to the downstream side of the gas supply main pipe 8, branched pipe passage opening and closing valves 10a, 10n interposed in the respective branched pipe passages 9a, 9n, orifices 6a, 6n provided on the downstream sides of the branched pipe passage opening and closing valves 10a, 10n, a temperature sensor 4 provided near the process gas passage between the control valve 3 and the orifices 6a, 6n, a pressure sensor 5 provided in the process gas passage between the control valve 3 and the orifices 6a, 6n, divided gas flow outlets 11a, 11n provided on the outlet sides of the orifices 6a, 6n, and an arithmetic and control unit 7 consisting of a pressure type flow rate arithmetic and control unit 7a that receives inputs of a pressure signal from the pressure sensor 5 and a temperature signal from the temperature sensor 4, computes a total flow rate Q of the process gas flows distributed through the orifices 6a, 6n, and outputs a control signal Pd to operate the control valve 3 to open/close in a direction to reduce a difference between the computed flow rate value and a flow rate set value to a valve drive unit 3a, and flow control of the process gas flows distributed through the respective orifices 6a, 6n is performed by the pressure type flow control unit 1a.

As a basic constitution of the invention according to a second aspect, a gas divided flow supplying apparatus for semiconductor manufacturing equipment includes a control valve 3 constituting a pressure type flow control unit 1a connected to a process gas inlet 11, a thermal type flow sensor 2 constituting a thermal type mass flow control unit 1b connected to the downstream side of the control valve 3, a gas supply main pipe 8 communicatively connected to the downstream side of the thermal type flow sensor 2, a plurality of branched pipe passages 9a, 9n connected in parallel to the downstream side of the gas supply main pipe 8, branched pipe passage opening and closing valves 10a, 10n interposed in the respective branched pipe passages 9a, 9n, orifices 6a, 6n provided on the downstream sides of the branched pipe passage opening and closing valves 10a, 10n, a temperature sensor 4 provided near the process gas passage between the control valve 3 and the orifices 6a, 6n, a pressure sensor 5 provided in the process gas passage between the control valve 3 and the orifices 6a, 6n, divided gas flow outlets 11a, 11n provided on the outlet sides of the orifices 6a, 6n, and an arithmetic and control unit 7 consisting of a pressure type flow rate arithmetic and control unit 7a that receives inputs of a pressure signal from the pressure sensor 5 and a temperature signal from the temperature sensor 4, computes a total flow rate Q of the process gas flows distributed through the orifices 6a, 6n, and outputs a control signal Pd to operate the control valve 3 to open/close in a direction to reduce a difference between the computed flow rate value and a flow rate set value to a valve drive unit 3a, and a thermal type flow rate arithmetic and control unit 7b that receives an input of a flow rate signal 2c from the thermal type flow sensor 2 and computes and displays the total flow rate Q of the process gas flows distributed through the orifices 6a, 6n from the flow rate signal 2c, and flow control of the process gas flows is performed by the pressure type flow control unit 1a when the process gas flows distributed through the respective orifices 6a, 6b are gas flows satisfying the critical expansion condition, and flow control of the process gas flows is performed by the thermal type mass flow control unit 1b when the process gas flows are gas flows that do not satisfy the critical expansion condition.

According to a third aspect of the present invention, in the first or second aspect, the hole diameters of the plurality of orifices 6a, 6n are set to the same hole diameter to supply the process gas flows Qa, Qn at the same flow rate to the respective branched pipe passages 9a, 9n.

According to a fourth aspect of the present invention, in the first or second aspect, the process gas is distributed through only an arbitrary branched pipe passage (or passages) of the plurality of branched pipe passages 9a, 9n.

According to a fifth aspect of the present invention, in the first aspect, the control valve 3, the orifices 6a, 6n, the pressure sensor 5, the temperature sensor 4, the branched pipe passages 9a, 9n, the branched pipe passage opening and closing valves 10a, 10n, and the gas supply main pipe 8 are integrally assembled and formed in one body.

According to a sixth aspect of the present invention, in the second aspect, the control valve 3, the thermal type flow sensor 2, the orifices 6a, 6n, the pressure sensor 5, the temperature sensor 4, the gas supply main pipe 8, the branched pipe passages 9a, 9b, and the branched pipe passage opening and closing valves 10a, 10n are integrally assembled and formed in one body.

According to a seventh aspect of the present invention, in the second aspect, flow control of the process gas is performed by the pressure type flow control unit 1a, and actual flow rates of the process gas are displayed by the thermal type flow control unit 1b.

According to an eighth aspect of the present invention, in the second aspect, the pressure sensor 5 is provided between the outlet side of the control valve 3 and the inlet side of the thermal type flow sensor 2.

According to a ninth aspect of the present invention, in the second aspect, the arithmetic and control unit 7 is arranged to display a warning when a difference between a fluid flow rate computed by the pressure type flow rate arithmetic and control unit 7a and a fluid flow rate computed by the thermal type mass flow arithmetic and control unit 7b exceeds a set value.

Effects of the Invention

According to the present invention, by one pressure type flow control unit or one pressure type flow control unit and one thermal type flow control unit, a process gas is supplied to a plurality of process chambers through a plurality of orifices connected in parallel, so that the structure of the gas divided flow supplying apparatus can be significantly simplified, downsized and compactified. When the plurality of orifices are the same orifice, divided flows at the same flow rate of the process gas can be simultaneously supplied to the plurality of process chambers that perform the same process, so that the gas divided flow supplying apparatus can be further downsized.

In addition, respective members constituting the gas divided flow supplying apparatus are integrally assembled in one body, so that the gas divided flow supplying apparatus can be significantly downsized.

Further, opening and closing of the respective branched pipe passage opening and closing valves are controlled from the arithmetic and control unit, so that the process gas can be supplied to only an arbitrary branched pipe passage (or passages), and the branched pipe passage to which the gas is supplied can be easily switched one another.

In addition, the thermal type flow control unit is provided, so that highly accurate flow control can be performed even for a process gas under a non-critical expansion condition, and even during flow control by the pressure type flow control unit under the critical expansion condition, the actual flow rate can be appropriately checked by using the thermal type flow control unit.

DETAILED DESCRIPTION OF THE PREFERRED EMBODIMENTS

Figure 1:
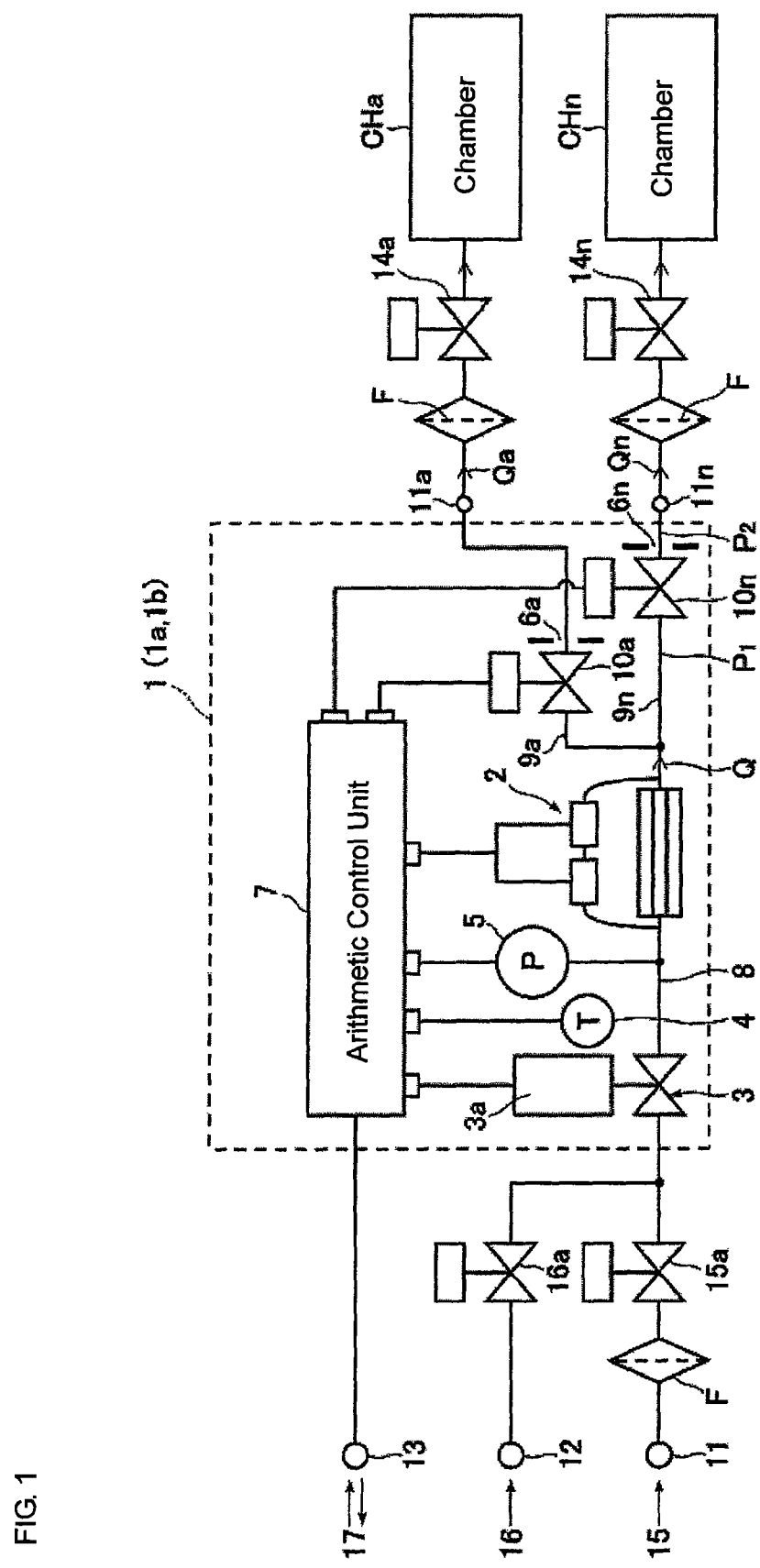
FIG. 1 is a block diagram of a gas divided flow supplying apparatus for semiconductor manufacturing equipment according to a preferred embodiment of the present invention.

Hereinafter, preferred embodiments of the present invention are described based on the drawings, in which like parts are indicated by like reference numerals.

FIG. 1 is a block diagram according to a first preferred embodiment of a gas divided flow supplying apparatus for semiconductor manufacturing equipment according to the present invention, and this gas divided flow supplying apparatus comprises two portions of a pressure type flow control unit and a thermal type flow control unit.

That is, the gas divided flow supplying apparatus 1 includes a pressure type flow control unit 1a and a thermal type flow control unit 1b. The pressure type flow control unit 1a further includes a control valve 3, a temperature sensor 4, a pressure sensor 5, a plurality of orifices 6a, 6n, a pressure type flow rate arithmetic and control unit 7a forming an arithmetic and control unit 7 and a gas supply main pipe 8, etc., and when gas flows distributed through the orifices 6a, 6n are under the critical expansion condition, for example, when the gas is $O_2$ or $N_2$ and the upstream side pressure $P_1$ and the downstream side pressure $P_2$ of the orifices 6a, 6n satisfy the relationship of $P_1/P_2 > 2$, divided gas flows at flow rates Qa, Qn are supplied while flow control is performed by the pressure type flow control unit 1a.

The thermal type flow control unit 1b includes a thermal type flow sensor unit 2 and a thermal type flow rate arithmetic and control unit 7b forming the arithmetic and control unit 7, etc. When gas flows distributed through the orifices 6a, 6n of the control unit are out of the critical expansion condition, divided gas flows at flow rates Qa, Qn are supplied to the respective chambers CHa, CHn, while flow control is performed by the thermal type flow control unit 1b.

Figure 2:
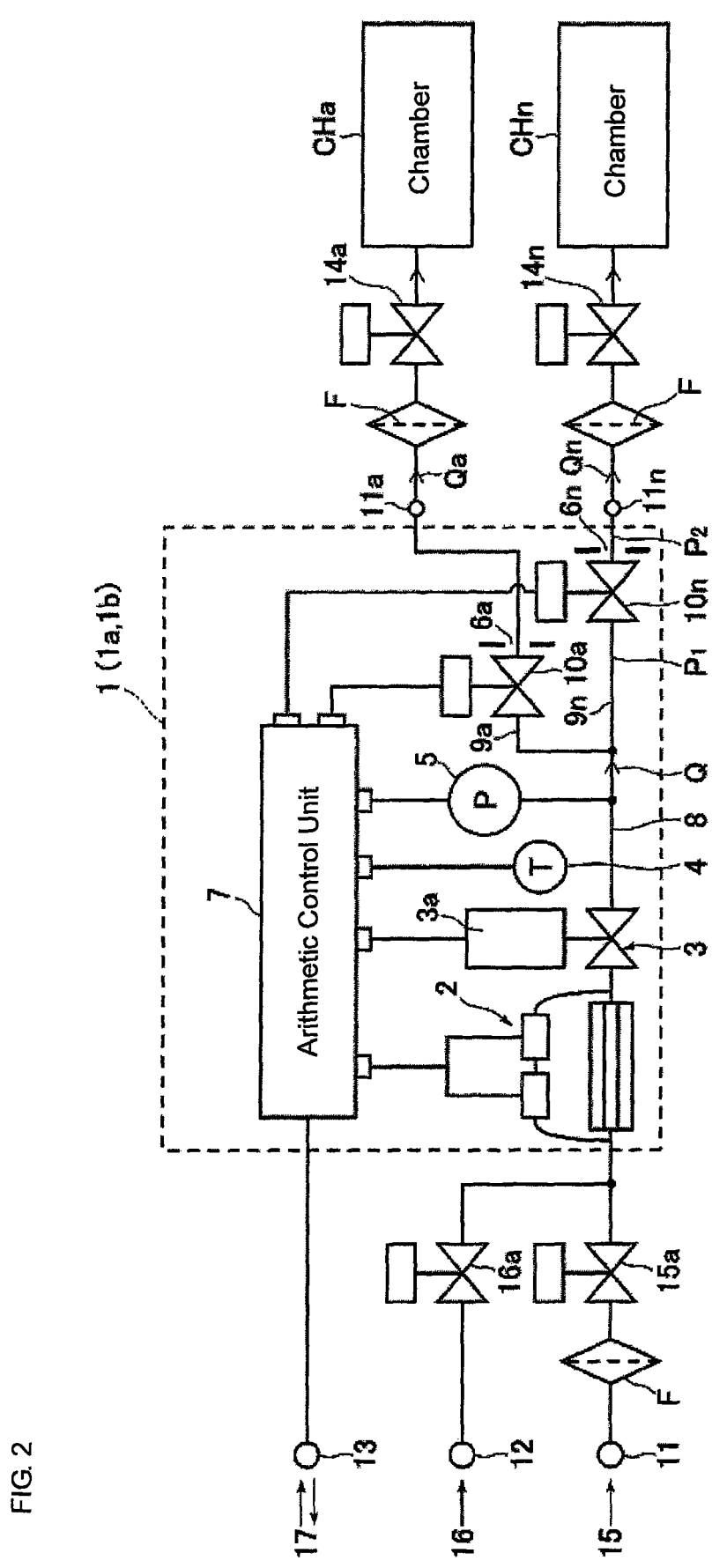
FIG. 2 is a block diagram of another gas divided flow supplying apparatus for semiconductor manufacturing equipment according to a preferred embodiment of the present invention.

FIG. 2 is a block diagram according to a second preferred embodiment of the present invention. The construction is the same as in FIG. 1 except that the position of the thermal type flow sensor 2 in the first preferred embodiment is moved to the upstream side of the control valve 3.

In FIG. 1 and FIG. 2, the reference symbol 3a denotes a piezoelectric type valve drive unit, 8 denotes a gas supply main pipe, 9a, 9n denote branched pipe passages, $10_1$, $10n$ denote branched pipe passage opening and closing valves, 11 denotes a process gas inlet, 11a, 11 n denote divided gas flow outlets, 12 denotes a purge gas inlet, 13 denotes a signal input-output terminal, F denotes a filter, 14a, 14n denote automatic opening and closing valves, 15 denotes a process gas, 15a denotes an automatic opening and closing valve, 16 denotes a purge gas, 16a denotes an automatic opening and closing valve, and 17 denotes an input-output signal.

Figure 3:
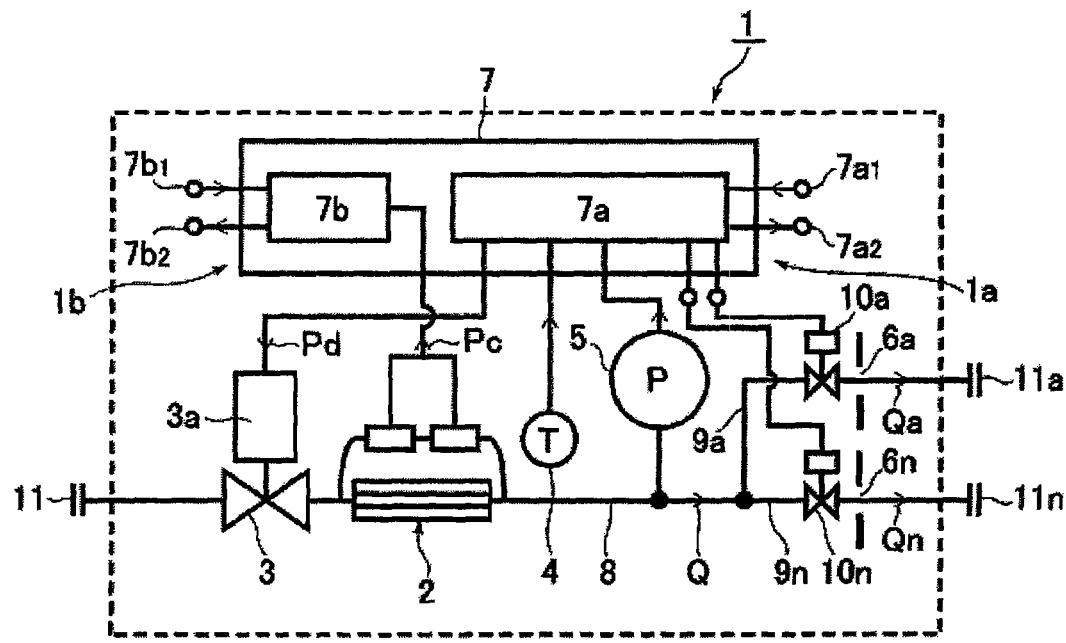
FIG. 3 is a block diagram showing a first example of the gas divided flow supplying apparatus.

FIG. 3 shows a first example of the present invention, and the gas divided flow supplying apparatus 1 comprises two portions of a pressure type flow control unit 1a and a thermal type flow control unit 1b.

The pressure type flow control unit 1a includes a control valve 3, a temperature sensor 4, a pressure sensor 5, a plurality of orifices 6a, 6n, and a pressure type flow rate arithmetic and control unit 7a forming the arithmetic and control unit 7.

Further, the thermal type flow control unit 1b includes a thermal type flow sensor 2 and a thermal type flow rate arithmetic and control unit 7b forming the arithmetic and control unit 7.

The pressure type flow control unit 1a includes, as described above, the control valve 3, the temperature sensor 4, the pressure sensor 5, the orifices 6a, 6n, and the pressure type flow rate arithmetic and control unit 7a, etc. A flow rate setting signal is input from an input terminal $7a_1$, and a flow rate output signal of the total process gas flow rate distributed through the orifices 6a, 6n (that is, the process gas flow rate Q distributed through the gas supply main pipe 8) computed by the pressure type flow control unit 1a is output from an output terminal $7a_2$.

In the present example, two divided flow supply passages are provided, so that the orifices 6a, 6n are provided, and the number of divided flow supply passages (that is, the number of orifices) are normally two or more.

The hole diameters of the respective orifices 6a, 6n are appropriately determined according to required gas supply flow rates to be supplied to the respective process chambers CHa, CHn. However, preferably, the hole diameters of the respective orifices 6a, 6n are set to be equal, and the divided gas flows Qa, Qn at the same flow rate are supplied to the respective process chambers CHa, CHn.

The pressure type flow control unit 1a itself using the orifices 6a, 6n is analogous to Japanese Patent No. 3291161, etc. A flow rate of a fluid distributed through an orifice under the critical expansion condition is computed by the pressure type flow rate arithmetic and control unit 7a based on a pressure detected by the pressure sensor 5, and a control signal Pd in proportion to a difference between the flow rate setting signal input from the input terminal $7a_1$ and the computed flow rate signal to the valve drive unit 3a of the control valve 3.

Figure 8:
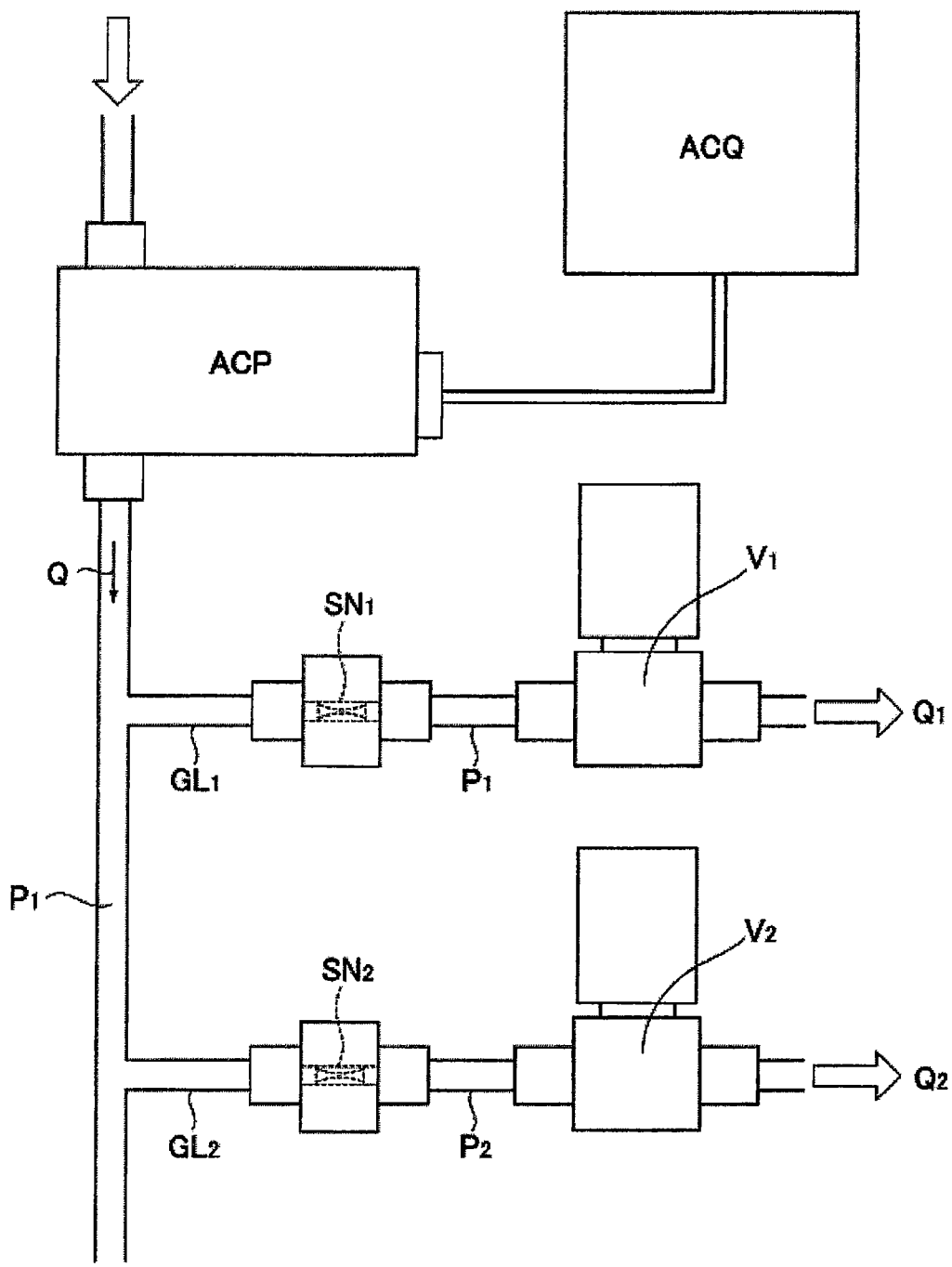
FIG. 8 is a schematic view of a flow control system using a conventional automatic pressure controller.

The construction of the pressure type mass flow control unit 1a and the flow rate arithmetic and control unit 7a are known, for example from FIG. 8 in Japanese Published Unexamined Patent Application No. 2000-305630, so that detailed descriptions thereof are omitted here.

In this pressure type flow control unit 1a, as a matter of course, various known accessory mechanisms such as a zero point adjustment mechanism, a flow rate abnormality detection mechanism, and a gas type converting mechanism (CF value conversion mechanism) are provided.

Further, in FIG. 3, the reference symbol 11 denotes a process gas inlet, 10a and 10n denote divided gas flow outlets, and 8 denotes a gas supply main pipe inside the apparatus main body.

The thermal type flow control unit 1b making up the gas divided flow supplying apparatus 1 includes a thermal type flow sensor 2 and a thermal type flow rate arithmetic and control unit 7b. The thermal type flow rate arithmetic and control unit 7b is provided with an input terminal $7b_1$ and an output terminal $7b_2$, respectively. From the input terminal $7b_1$, a flow rate setting signal is input, and from the output terminal $7b_2$, a flow rate signal (actual flow rate signal) detected by the thermal type flow sensor 2 is output.

The thermal type flow control unit 1b itself is known, for example from FIG. 2 in Japanese Published Unexamined Patent Application No. 2000-305630, so that detailed description thereof is omitted here.

In the present example, as the thermal type flow rate arithmetic and control unit 1b, one installed in the FCS-T1000 series made by Fujikin Incorporated is used.

As a matter of course, between the thermal type flow rate arithmetic and control unit 7b and the pressure type flow rate arithmetic and control unit 7a, the actual flow rate signal and computed flow rate signal are appropriately input and output, and the difference between the signals and the amount of the difference can be monitored, or when the difference between the signals exceeds a predetermined value, a warning can be issued although these are not illustrated in FIG. 3.

Figure 4:
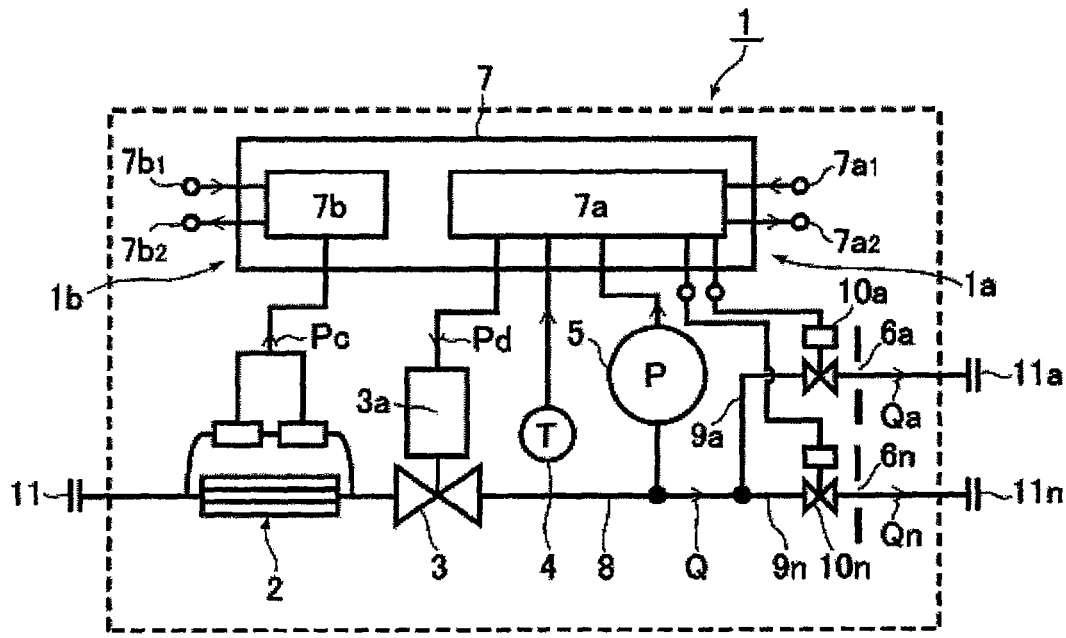
FIG. 4 is a block diagram showing a second example of the gas divided flow supplying apparatus.
Figure 5:
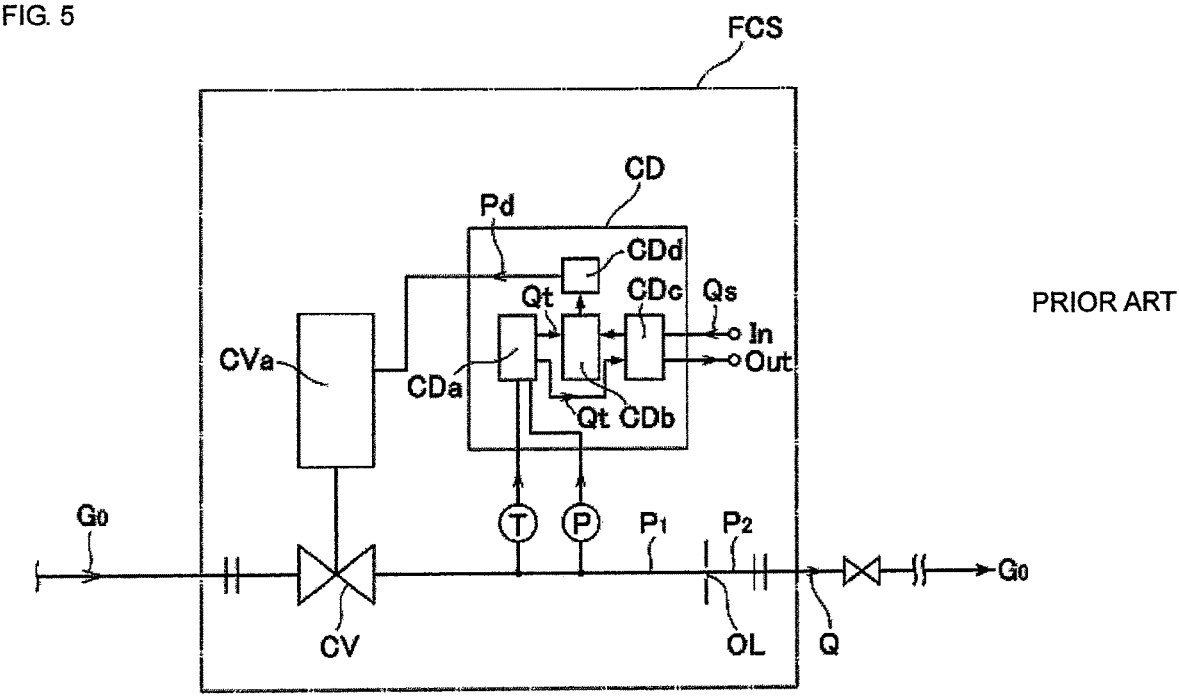
FIG. 5 is an explanatory drawing of a conventional pressure type flow control system.
Figure 6:
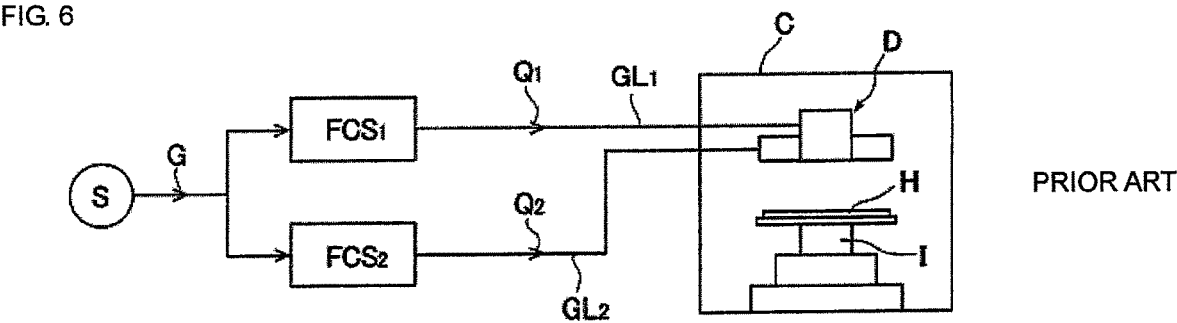
FIG. 6 is an explanatory drawing of a gas divided flow supplying apparatus using the conventional pressure type flow control system.
Figure 7:
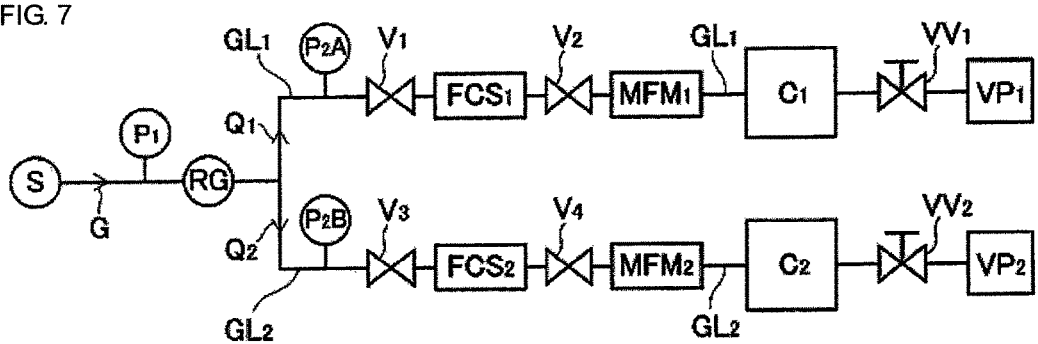
FIG. 7 is an explanatory drawing of another gas divided flow supplying apparatus using the conventional pressure type flow control system.

FIG. 4 shows a second example of the gas divided flow supplying apparatus 1 according to the present invention, in which the attaching positions of the control valve 3 and the thermal type flow sensor 2 are reversed to that in the first example.

It is also possible that pressure sensors are separately provided on the downstream sides of the respective orifices to monitor whether or not the fluid flows distributed through the orifices 6a, 6n are under the critical expansion condition and issue a warning, and flow control by the pressure type flow control unit 1a is automatically switched to flow control by the thermal type flow control unit 1b although these are not illustrated in FIG. 3 and FIG. 4.

Further, as a matter of course, the branched pipe passage opening and closing valves 10a, 10n are appropriately driven to open and close by signals from the arithmetic and control unit 7.

In the embodiment shown in FIG. 1 and FIG. 2, the positions of the thermal type flow sensor 2 and the control valve 3 are switched between the figures, however, it was confirmed through tests that the constitution in which the thermal type flow sensor 2 is disposed on the downstream side of the control valve 3 (FIG. 1 and FIG. 3) is more preferable in reducing the influence of pressure fluctuation, etc., of the supply source side of the process gas 15 and realizing more highly accurate flow control.

In the embodiments and examples shown in FIG. 1 to FIG. 4, the attaching positions (detecting positions) of the temperature sensor 4 and the pressure sensor 5 are changed, respectively. However, it was confirmed through tests that the flow control accuracy, etc., hardly fluctuate by the attaching positions of the temperature sensor 4 and the pressure sensor 5. The attaching position of the temperature sensor 4 may be any position of the gas supply main pipe 8, as long as the position is on the downstream side of the control valve 3 or the thermal type flow sensor 2.

Further, in FIG. 3 and FIG. 4 described above, the control valve 3, the temperature sensor 4, the pressure sensor 5, the orifices 6a, 6n, the thermal type flow sensor 2, the gas supply main pipe 8, the branched pipe passages 9a, 9n, the branched pipe passage opening and closing valves 10a, 10n, the process gas inlet 11, and the divided gas flow outlets 11a, 11n, etc., are shown independently of each other. However, in actuality, the respective members described above forming the pressure type flow control unit 1a and the thermal type flow control unit 1b are preferably integrally formed, assembled, and fixed in one body (not illustrated).

Next, operation of the gas divided flow supplying apparatus according to the present invention is described. Referring to FIG. 1 and FIG. 3, first, purging is performed inside the gas divided flow supplying apparatus 1 by using the purge gas 16, and after purging is finished, the opening and closing valves 15a, 16a are closed and the branched pipe passage opening and closing valves 10a, 10n are opened to depressurize the insides of the chambers CHa, CHn. Furthermore, a set flow rate signal is input from the input terminal $7a_1$ of the pressure type flow rate arithmetic and control unit 7a of the arithmetic and control unit 7, and a predetermined set flow rate signal is also input into the input terminal $7b_1$ of the thermal type flow rate arithmetic and control unit 7b.

Thereafter, by opening the opening and closing valve 15a on the process gas supply side and actuating the pressure type flow rate arithmetic and control unit 7a, the control valve 3 is opened, and divided gas flows the total flow rate of which is Q=Qa+Qn corresponding to the set flow rate signal are supplied from the divided gas flow outlets 11a, 11n to the respective process chambers CHa, CHn through the gas supply main pipe 8, the branched pipe passage opening and closing valves 10a, 10n, and the orifices 6a, 6n.

The hole diameters of the respective orifices 6a, 6n are determined in advance based on the orifice primary side pressure $P_1$ and the required flow rates Qa, Qn, and by controlling the orifice primary side pressure $P_1$ by opening degree adjustment of the control valve 3, the total flow rate Q=Qa+Qn is controlled to the set flow rate.

The gas divided flow supplying apparatus 1 according to various embodiments of the present invention is used mainly to supply the process gas to the plurality of process chambers CHa, CHn that perform the same process. Therefore, the hole diameters of the respective orifices 6a, 6n are normally selected to be equal to each other.

When the critical expansion condition is satisfied between the primary side pressure $P_1$ and the secondary side pressure $P_2$ of the orifices 6a, 6n, flow control is performed by the pressure type flow control unit 1a. The thermal type flow control unit 1b is actuated as necessary, and the actual flow rate of the process gas Q distributed inside the gas supply main pipe 8 is checked and displayed, etc.

On the other hand, due to the pressure conditions, etc., of the process chamber CHa, CHn side, when the process gas flows distributed through the respective orifices 6a, 6n are out of the critical expansion condition ($P_1/P_2 \leq 2$), flow control by the pressure type flow control unit 1a automatically switches to flow control by the thermal type flow control unit 1b, and the thermal type flow rate arithmetic and control unit 7b is actuated instead of the pressure type flow rate arithmetic and control unit 7a, and accordingly, the process gas flow rates are controlled.

As a result, even when the process gas flows distributed through the orifices 6a, 6n are out of the critical expansion condition, high-accurate flow control can be performed regardless of the pressure condition of $P_1/P_2$ described above.

In the respective examples, etc., described above, description is given by assuming that the process gas is supplied to all of the plurality of divided flow pipe passages 9a, 9n, however, as a matter of course, it is also possible that the gas is supplied to only a necessary divided flow pipe passage (or passages), for example, only the divided flow pipe passage (or passages) 9a in which the orifice 6a is interposed.

Furthermore, in the respective examples of preferred embodiments, etc., described above, both of the pressure type flow control unit 1a and the thermal type flow control unit 1b are provided. However, it is also possible for the thermal type flow control unit 1b to be omitted and the gas divided flow supplying apparatus provided with only the pressure type flow control unit 1b.

The present invention is applicable not only to gas divided flow supplying equipment for semiconductor manufacturing equipment, but also to fluid supplying apparatuses for chemical goods production equipment, etc., as long as the apparatuses divide a fluid under the critical expansion condition.

DESCRIPTION OF REFERENCE SYMBOLS

CHa, CHn: process chamber
Q: total process gas flow rate
Qa, Qn: divided gas flow
$P_1$: orifice upstream side pressure
$P_2$: orifice downstream side pressure
1: gas divided flow supplying apparatus for semiconductor manufacturing equipment
1a: pressure type flow control unit
1b: thermal type flow control unit
2: thermal type flow sensor
3: control valve
3a: piezoelectric type valve drive unit
4: temperature sensor
5: pressure sensor
6a, 6n: orifice
7: arithmetic and control unit
7a: pressure type flow rate arithmetic and control unit
7b: thermal type flow rate arithmetic and control unit
8: gas supply main pipe
9a, 9n: branched pipe passage
10a, 10n: branched pipe passage opening and closing valve
11: process gas inlet
11a, 11n: divided gas flow outlet
12: purge gas inlet
13: signal input-output
14a, 14n: opening and closing valve
15: process gas
15a: opening and closing valve
16: purge gas
16a: opening/closing valve
17: input-output signal

The invention claimed is:

1. A gas divided flow supplying apparatus for semiconductor manufacturing equipment, comprising:
a process gas inlet; and
a pressure type flow control unit connected to the process gas inlet;
wherein the pressure type flow control unit further comprises a single control valve, having an upstream side and a downstream side;

a valve drive unit operably connected to control the single control valve;

a gas supply main pipe communicatively connected to the downstream side of the single control valve;

a plurality of branched pipe passages connected in parallel to the downstream side of the gas supply main pipe;

wherein each of the plurality of branched pipe passages is adapted to be connected to a different process chamber;

branched pipe passage opening and closing valves interposed in the respective branched pipe passages;

a plurality of orifices provided on the downstream sides, respectively, of the plurality of branched pipe passage opening and closing valves;

wherein hole diameters of the plurality of orifices are set to the same hole diameter to supply the process gas flows at the same flow rate to the respective branched pipe passages;

a temperature sensor provided near the process gas passage between the control valve and the orifices;

a pressure sensor provided in the process gas passage between the control valve and the orifices;

divided gas flow outlets provided on the outlet sides of the orifices,;

an arithmetic and control unit including a pressure type flow rate arithmetic and control unit operably connected to receive inputs of a pressure signal from the pressure sensor and a temperature signal from the temperature sensor, wherein the pressure type flow rate arithmetic and control unit is configured to compute a total flow rate Q of the process gas flows distributed through the orifices, and output a control signal to operate the control valve to open or close in a direction to reduce a difference between the computed flow rate value and a flow rate set value to the valve drive unit, wherein flow control of process gas flows distributed through the respective orifices is performed by the pressure type flow control unit;

wherein a branched pipe passage to which the gas is supplied is switched by controlling respective branched pipe passage opening and closing valves;

wherein the branched pipe passage opening and closing valves are on-off switching valves.

2. The gas divided flow supplying apparatus for semiconductor manufacturing equipment according to claim 1, wherein the process gas is distributed through only one or more arbitrary branched pipe passage of the plurality of branched pipe passages.

3. The gas divided flow supplying apparatus for semiconductor manufacturing equipment according to claim 1, wherein the control valve, the orifices, the pressure sensor, the temperature sensor, the branched pipe passages, the branched pipe passage opening and closing valves, and the gas supply main pipe are integrally assembled and formed in one body.

4. A gas divided flow supplying apparatus for semiconductor manufacturing equipment, comprising:

a process gas inlet; and a pressure type flow control unit connected to a process gas inlet;

wherein the pressure type flow control unit further comprises a single control valve having an upstream side and a downstream side;

a thermal type flow sensor including a thermal type mass flow control unit connected to the downstream side of the control valve;

a gas supply main pipe communicatively connected to the downstream side of the thermal type flow sensor;

a plurality of branched pipe passages connected in parallel to the downstream side of the gas supply main pipe;

branched pipe passage opening and closing valves interposed in the respective branched pipe passages;

wherein each of the plurality of branched pipe passages is adapted to be connected to a different process chamber;

a plurality of orifices provided on the downstream sides, respectively, of the branched pipe passage opening and closing valves;

wherein hole diameters of the plurality of orifices are set to the same hole diameter to supply the process gas flows at the same flow rate to the respective branched pipe passages a temperature sensor provided near the process gas passage between the control valve and the orifices;

a pressure sensor provided in the process gas passage between the control valve and the orifices;

divided gas flow outlets provided on the outlet sides of the orifices; and an arithmetic and control unit including (a) a pressure type flow rate arithmetic and control unit operably connected to receive inputs of a pressure signal from the pressure sensor and a temperature signal from the temperature sensor, wherein the pressure type flow rate arithmetic and control unit is configured to compute a total flow rate (Q) of process gas flows distributed through the orifices, and output a control signal (Pd) to operate the control valve to open or close in a direction to reduce a difference between the computed flow rate value and a flow rate set value to a valve drive unit, and (b) a thermal type flow rate arithmetic and control unit operably connected to recieve an input of a flow rate signal from the thermal type flow sensor and wherein the thermal type flow rate arithmetic and control unit is configured to compute and display a total flow rate (Q) of the process gas flows distributed through the orifices from the flow rate signal, wherein the arithmetic and control unit is configured to perform flow control of the process gas flows by the pressure type flow control unit when the process gas flows distributed through the respective orifices are gas flows satisfying the critical expansion condition, and the aritmetic and control unit is configured to perform flow control of the process gas flows by the thermal type mass flow control unit when the process gas flows are gas flows that do not satisfy the critical expansion condition;

wherein a branched pipe passage to which the gas is supplied is switched by controlling respective branched pipe passage opening and closing valves; and wherein the branched pipe passage opening and closing valves are on-off switching valves.

5. The gas divided flow supplying apparatus for semiconductor manufacturing equipment according to claim 4, wherein the control valve, the thermal type flow sensor, the orifices, the pressure sensor, the temperature sensor, the gas supply main pipe, the branched pipe passages, and the branched pipe passage opening and closing valves are integrally assembled and formed in one body.

6. The gas divided flow supplying apparatus for semiconductor manufacturing equipment according to claim 4, wherein flow control of the process gas is performed by the pressure type flow control unit, and actual flow rates of the process gas are displayed by the thermal type flow control unit.

7. The gas divided flow supplying apparatus for semiconductor manufacturing equipment according to claim 4, wherein the pressure sensor is provided between the outlet side of the control valve and the inlet side of the thermal type flow sensor.

8. The gas divided flow supplying apparatus for semiconductor manufacturing equipment according to claim 4, wherein the arithmetic and control unit is arranged to display a warning when a difference between a fluid flow rate computed by the pressure type flow rate arithmetic and control unit and a fluid flow rate computed by the thermal type mass flow arithmetic and control unit exceeds a set value.

9. The gas divided flow supplying apparatus for semiconductor manufacturing equipment according to claim 4, wherein the process gas is distributed through only one or more arbitrary branched pipe passage of the plurality of branched pipe passages.

* * * * *